UNITED STATES PATENT OFFICE 2,482,066

ACETYLATION OF COMPOUNDS CONTAINING A —CO—(CH₂)ₓ—CO— GROUP

David C. Hull and Albert H. Agett, Kingsport, Tenn., assignors to Eastman Kodak Company, Rochester, N. Y., a corporation of New Jersey No Drawing. Application October 19, 1946, Serial No. 704,524

7 Claims. (Cl. 260—483)

This invention relates to a method of acetylating keto-compounds containing a $$-CO-(CH_2)_x-CO-$$

group and malonic acid esters using isopropenyl acetate and a catalyst, usually an acid catalyst.

Often it is desirable to introduce acetyl groups into organic compounds to impart desired properties thereto. We have found a convenient method of introducing acetyl groups into keto-compounds containing a —CO—(CH₂)ₓ—CO— group and malonic acid esters. Some of the compounds of this type are β-diketones and γ-diketones, β-ketoesters, γ-ketoesters and malonic acid esters. In the formula $$-CO-(CH_2)_x-CO-$$

as used herein, $x$ represents an integer of 1 or 2. Any of the compounds of this type can be readily acylated by reacting thereon with isopropenyl acetate and a catalyst.

One object of our invention is to prepare acetylated products of compounds containing $$-CO-(CH_2)_x-CO-$$

groups. Other objects of our invention will appear herein.

Our invention is carried out by reacting isopropenyl acetate with a β-diketone and a γ-diketone, a β-ketoester, a γ-ketoester or a malonic acid ester in the presence of a catalyst. Ordinarily it is desirable to dissolve the catalyst in the isopropenyl acetate and then add to the compound containing the COCH₂CO group and to use an elevated temperature for the purpose of speeding the reaction and removing the acetone which is formed. The acylated compound is present in the mass and can be isolated therefrom by neutralizing the catalyst and distilling off the acylated compound under diminished pressure.

Although ordinarily sulfuric acid is selected as the catalyst in an acetylation process in accordance with our invention, it is to be understood that various other catalysts may be used. The catalyst employed may be an acid or it may be a tertiary nitrogenous material. Some acids which are useful for catalyzing processes in accordance with our invention are sulfuric acid, p-toluene sulfonic acid, selenic acid, N-acetyl sulfamic acid, zinc chloride and boron trifluoride etherate. Other compounds useful as catalysts are triethyl amine, pyridine and benzyl dimethyl amine.

Ordinarily it is only necessary to employ a temperature elevated to a point at which refluxing occurs in order to promote the reaction. Nevertheless, the process can be carried out in an autoclave and temperatures up to 100° C. or even as much as 300° C. can be employed to prepare the acylated product in accordance with our invention. After the reaction has occurred, it is ordinarily desirable to remove the acetone from the mass which is one of the products of the reaction, and then neutralize the catalyst and distill under reduced pressure to obtain the desired product or products. Oftentimes the reaction of isopropenyl acetate and the compound containing $$-CO-(CH_2)_x-CO-$$

results in a mixture of acetylated products. In that case it is desirable to selectively distill the mass under reduced pressure to separate the products which have been formed.

The following examples illustrate our invention:

*Example 1.*—100 grams of isopropenyl acetate were mixed with 130 grams of acetoacetic ester containing 6 drops of sulfuric acid. The mass was then heated in a distillation apparatus at atmospheric pressure (740 mm.). When the temperature had reached 58° C., 24.5 grams of acetone had been distilled off. Magnesium carbonate was added to the mass to neutralize the catalyst, and it was then distilled under reduced pressure (3 mm.). 37 grams of the C-acetylated derivative of the acetoacetic ester were obtained. The resulting product boiled at 72–75° C. at 3 mm. pressure and had an equivalent weight of 89.

*Example 2.*—65 grams of ethyl acetoacetate were mixed with 100 grams of isopropenyl acetate, and 10 drops of sulfuric acid were added. The mass was refluxed and then subjected to distillation. 30 cc. of acetone distilled off. The catalyst was neutralized with sodium acetate, and the enol acetates which had been formed were distilled off at 94° C. and 10 mm. pressure. The yield was 92%.

*Example 3.*—A mixture was prepared of 100 grams of acetyl acetone, 200 grams isopropenyl acetate and 2 grams of sulfuric acid. The mass was refluxed, and the acetone was distilled off. The acetylation catalyst was neutralized with sodium acetate, and the mass was distilled at 10 mm. pressure. 80 grams of the monoenol acetate were obtained having a boiling point of 84° C. at 10 mm. pressure, and 27 grams of di-acetate were obtained having a boiling point of 114° C. at 10 mm. pressure.

*Example 4.*—100 grams of isopropenyl acetate were mixed with 160 grams of diethyl malonate and 6 drops of sulfuric acid were added. The mass was heated in a distillation apparatus at atmospheric pressure. The acetylation proceeded rapidly and 9.7 grams of acetone were recovered at 50–58° C. Magnesium carbonate was then added to the mass to neutralize the sulfuric acid. The unreacted isopropenyl acetate was removed at 90–100° C. The mass was then distilled at a temperature of 115–120° C. and 17 mm. pressure. 20 grams of acetyl ethyl malonate were recovered.

Example 5.—100 parts of acetyl acetone were mixed with 200 parts of isopropenyl acetate containing 1 part of zinc chloride. The solution was heated at total reflux for 2 hours. Distillation gave 56 parts of acetone. The residue was then distilled under reduced pressure. There was obtained 34 parts of the monoenol acetate of acetyl acetone and 72 parts of triacetyl methane, boiling point 103–4° C. at 20 mm. pressure.

Example 6.—100 parts of ethyl acetoacetate were mixed with 1 part of selenic acid in 200 parts of isopropenyl acetate. The solution was refluxed for 6 hours. Distillation gave 54 parts of acetone. The excess isopropenyl acetate was removed by distillation at atmospheric pressure and a temperature of 90–100° C. The residue was distilled at reduced pressure, and 102 parts of diacetyl ethyl acetate, boiling point 88–90° C. at 10 mm. pressure was obtained.

Example 7.—100 grams of isopropenyl acetate were mixed with 57 grams of acetonyl acetone and 6 drops of sulfuric acid. The mixture was fractionated at atmospheric pressure (740 mm.). At 55–60° C., 54.4 grams of acetone were distilled off. At 92–96° C. 43.7 grams of 2,5-dimethyl furane were distilled over, giving a good conversion of acetonyl acetone to 2,5-dimethyl furane.

Example 8.—72 grams of ethyl levulinate (a γ-ketoester) were mixed with 100 grams of isopropenyl acetate and 20 drops of sulfuric acid. The mass was heated at reflux, and the acetone formed was distilled off. At the end of one hour the catalyst was neutralized, and the enol acetates formed were distilled from the mass at 89° C. and 5 mm. pressure. A yield of 45 grams was obtained.

In the above examples, other compounds having —CO—CH₂—CO— groups may be acetylated using isopropenyl acetate and an acid catalyst. For instance, in the β-diketones, γ-diketones, and ketoesters and β-ketoesters other alkyl groups than methyl may be present in the compounds employed, and the reactions will go in the same manner as described in the examples.

Ordinarily the acetylation of compounds containing —CO—(CH₂)ₓ—CO— results in a mixture of C-acetylated and O-acetylated products. In many processes the O-acetylated product (the enol acetates) predominates and the C-acetylated product is minor in proportion. In other cases, such as by the processes of Examples 4, 5, and 6 or where certain catalysts, such as selenic acid are used, the formation of C-acetylated products predominates. The O-acetylated and C-acetylated products may be separated by distilling at reduced pressure as illustrated by Example 3. Our invention includes the acetylation generally of compounds containing —CO—CH₂—CO— with isopropenyl acetate regardless of whether the C-acetylated or the O-acetylated products predominate.

What we claim and desire to secure by Letters Patent of the United States is:

1. A method of acetylating a compound having the formula:

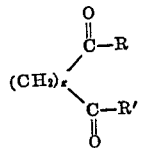

in which R is alkyl and R' is a group selected from alkyl and ethoxy, x being an integer of not more than 2 which comprises reacting thereon with isopropenyl acetate in the presence of an esterification catalyst selected from the group consisting of sulfuric acid, p-toluene sulfonic acid, selenic acid, N-acetyl sulfamic acid, zinc chloride, boron trifluoride etherate, triethylamine, pyridine and benzyl dimethylamine.

2. A method of acetylating a compound having the formula:

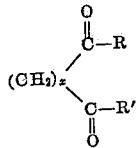

R and R' being alkyl and x being an integer of not more than 2 which comprises reacting thereon with isopropenyl acetate in the presence of an esterification catalyst selected from the group consisting of sulfuric acid, p-toluene sulfonic acid, selenic acid, N-acetyl sulfamic acid, zinc chloride, boron trifluoride etherate, triethylamine, pyridine and benzyl dimethylamine.

3. A method of acetylating a compound having the formula:

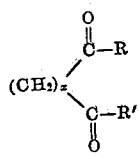

R being alkyl and R' being ethoxy, x being an integer of not more than 2 which comprises reacting thereon with isopropenyl acetate in the presence of an esterification catalyst selected from the group consisting of sulfuric acid, p-toluene sulfonic acid, selenic acid, N-acetyl sulfamic acid, zinc chloride, boron trifluoride etherate, triethylamine, pyridine and benzyl dimethylamine.

4. A method of acetylating a compound having the formula:

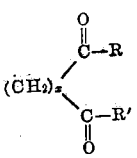

R and R' being alkyl groups and x being an integer of not more than 2 which comprises reacting thereon with isopropenyl acetate in the presence of a sulfuric acid catalyst.

5. A method of acetylating a compound having the formula:

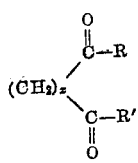

R being alkyl and R' being ethoxy and x being an integer of not more than 2 which comprises reacting thereon with isopropenyl acetate in the presence of a sulfuric acid catalyst.

6. A method of acetylating acetyl acetone which comprises reacting thereon with isopropenyl acetate in the presence of sulfuric acid.

7. A method of acetylating ethyl acetoacetate which comprises reacting thereon with isopropenyl acetate in the presence of sulfuric acid.

DAVID C. HULL.
ALBERT H. AGETT.

REFERENCES CITED

The following references are of record in the file of this patent:

UNITED STATES PATENTS

| Number | Name | Date |
| --- | --- | --- |
| 2,342,612 | Hansley | Feb. 22, 1944 |
| 2,355,971 | Hansley | Aug. 15, 1944 |
| 2,407,301 | Spence et al. | Sept. 10, 1946 |
| 2,407,302 | Spence et al. | Sept. 10, 1946 |